United States Patent
Higuchi et al.

(10) Patent No.: US 8,663,384 B2
(45) Date of Patent: Mar. 4, 2014

(54) CEMENT ADMIXTURE AND CEMENT COMPOSITION

(75) Inventors: Takayuki Higuchi, Itoigawa (JP); Tsutomu Kida, Itoigawa (JP); Ryoetsu Yoshino, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/991,524

(22) PCT Filed: Oct. 24, 2011

(86) PCT No.: PCT/JP2011/074379
§ 371 (c)(1),
(2), (4) Date: Jun. 4, 2013

(87) PCT Pub. No.: WO2012/077418
PCT Pub. Date: Jun. 14, 2012

(65) Prior Publication Data
US 2013/0247796 A1   Sep. 26, 2013

(30) Foreign Application Priority Data
Dec. 8, 2010   (JP) ................................ 2010-273747

(51) Int. Cl.
*C04B 22/14*   (2006.01)
*C04B 28/16*   (2006.01)

(52) U.S. Cl.
USPC .......................................... 106/775; 106/722

(58) Field of Classification Search
USPC ................................................ 106/722, 775
See application file for complete search history.

(56) References Cited

FOREIGN PATENT DOCUMENTS

| JP | 42-021840 B | 10/1967 |
| JP | 53-031170 B | 8/1978 |
| JP | 07-232944 A | 9/1995 |
| JP | 2001-064054 A | 3/2001 |
| JP | 2002-293592 A | 10/2002 |
| JP | 2009-173494 A | 8/2009 |

OTHER PUBLICATIONS

Mario Chiruzzi et al., "The Debate Continues . . . ". World Cement, Sep. 2007, pp. 107-112.
Matteo Magistri et al., "Research Study: Stannous Sulfate", World Cement, Feb. 2007, pp. 89-91.
PCT, "International Search Report for PCT/JP2011/074379", Jan. 17, 2012.

*Primary Examiner* — Anthony J Green
(74) *Attorney, Agent, or Firm* — Manabu Kanesaka

(57) ABSTRACT

The invention provides a cement admixture that improves the ability of concrete to bring about high initial strength, works in favor of enhancing the effect on hexavalent chromium reductions, and is less likely to decrease in the effect on hexavalent chromium reductions even upon storage as well as a method for reducing hexavalent chromium. The invention is embodied as (1) A cement admixture, characterized by comprising an expanding material containing free lime, a hydraulic compound and calcium sulfate anhydrite, and a tin sulfate-containing substance; (2) The cement admixture according to (1), characterized in that the tin sulfate-containing substance is contained in an amount of 0.2 to 8 parts by mass—as calculated on a tin sulfate basis—in a total of 100 parts by mass of the expanding material and the tin sulfate-containing substance; (3) The cement admixture according to (1) or (2), characterized in that the expanding material has been treated with carbon dioxide gas to form calcium carbonate therein; (4) The cement admixture according to any one of (1) to (3), characterized in that the expanding material has been surface treated with a shrinkage reducer; (5) A cement composition, characterized by containing cement, and the cement admixture according to any one of (1) to (4); and (6) A method for reducing hexavalent chromium, characterized by use of the cement composition according to (5).

5 Claims, No Drawings

CEMENT ADMIXTURE AND CEMENT COMPOSITION

RELATED APPLICATIONS

The present application is National Phase of International Application No. PCT/JP2011/074379 filed Oct. 24, 2011, and claims priority from Japanese Applications No. 2010-273747, filed December 8.

BACKGROUND OF THE INVENTION

1. Field of the Invention

The present invention relates to a cement admixture and a cement composition used in the civil engineering and construction fields.

2. Description of the Prior Art

There have so far been expanding agents used for the purposes of increasing the initial strength of cement concrete, preventing its cracking and introducing chemical prestress in it (Patent Publications 1-4).

In the meantime, it has been known that tin sulfates provide an effective material capable of reducing hexavalent chromium dissolving out from cement concrete (Patent Publication 5, and Non-Patent Publications 1 and 2).

Patent Publication 5 teaches to the effect that "known additives such as hardening accelerators, hardening retarders, contraction or shrinkage reducers and rebar rust-preventives and special admixtures such as expanding materials may be added, and their addition does not arise any specific problems", but it says nothing about reductions of hexavalent chromium by combined use of tin sulfates and an expanding material.

LISTING OF THE PRIOR ARTS

Patent Publications

Patent Publication 1: JP(B) 42-021840
Patent Publication 2: JP(B) 53-031170
Patent Publication 3: JP(A) 07-232944
Patent Publication 4: JP(A) 2001-064054
Patent Publication 5: JP(A) 2009-173494

Non-Patent Publications

Non-Patent Publication 1: World Cement, 107-112, September, 2007, The debate Continues, Mario Chiruzzi, Riccardo Stoppa (Grace Construction Products)
Non-Patent Publication 2: World Cement, 89-91, February, 2007, Research Study: Stannous Sulfate, Matteo Magistri (Mapei SpA)

SUMMARY OF THE INVENTION

Objects of the Invention

Most incinerated sewage sludge ashes contain phosphorus and hexavalent chromium. For this reason, when concrete products containing incinerated sewage sludge ashes are produced, phosphorus may retard cement reactions, often resulting in a lowering of the initial strength of concrete and dissolution of hexavalent chromium out from hardened or set masses.

Although tin sulfates have some effects on reductions of hexavalent chromium, yet they are still less effective against concrete with incinerated sewage sludge ashes blended with it. Tin sulfates react with free lime and moistures, turning readily into tin hydroxides that are less effective in reductions of hexavalent chromium, so offering a problem in that their performance deteriorates during storage as it is mixed with a material containing more free lime having high hygroscopicity.

The invention provides a cement admixture and a cement composition which allow concrete to have good enough initial strength, have a higher effect on reductions of hexavalent chromium, and keep the effect on reductions of hexavalent chromium intact even when they are stored as a cement mixture as well as a method for reducing hexavalent chromium.

Means for Accomplishing the Objects

To provide a solution to the aforesaid problems, the present invention is embodied as follows:

That is, the invention is embodied in the form of:

(1) A cement admixture, characterized by comprising an expanding material containing free lime, a hydraulic compound and calcium sulfate anhydrite, and a tin sulfate-containing substance;

(2) The cement admixture according to (1), characterized in that the tin sulfate-containing substance is contained in an amount of 0.2 to 8 parts by mass—as calculated on a tin sulfate basis—in a total of 100 parts by mass of said expanding material and said tin sulfate-containing substance;

(3) The cement admixture according to (1) or (2), characterized in that said expanding material has been treated with carbon dioxide gas to form calcium carbonate therein;

(4) The cement admixture according to any one of (1) to (3), characterized in that said expanding material has been surface treated with a shrinkage reducer;

(5) A cement composition, characterized by containing cement, and the cement admixture according to any one of (1) to (4); and (6) A method for reducing hexavalent chromium, characterized by use of the cement composition according to (5).

Advantages of the Invention

The inventive cement admixture has merits of making sure concrete allows for high initial strength, having high effects on reductions of hexavalent chromium, and keeping the effect on reductions of hexavalent chromium substantially intact even as stored as a cement admixture.

MODE FOR CARRYING OUT THE INVENTION

Unless otherwise stated, the "parts" and "%" used herein are given on a mass basis.

The "concrete" used herein is a general term for cement pastes, cement mortars and cement concretes.

The "expanding material" used herein refers to an expanding material that contains free lime, a hydraulic compound and calcium sulfate anhydrite, and is obtained by heat treatment of a proper mixture comprising CaO, $Al_2O_3$, $Fe_2O_3$, $SiO_2$ and $CaSO_4$ raw materials, with or without having being treated with carbon dioxide gas.

The "free lime" used herein refers to what is usually called f-CaO.

The "hydraulic compound" used herein refers to hauyne represented by $3CaO.3Al_2O_3.CaSO_4$, calcium silicate represented by $3CaO.SiO_2$ ($C_3S$ for short) or $2CaO.SiO_2$ ($C_2S$ for short), calcium aluminoferrite represented by $4CaO \cdot Al_2O_3 \cdot Fe_2O_3$ ($C_4AF$ for short), $6CaO \cdot 2Al_2O_3 \cdot Fe_2O_3$ ($C_6A_2F$ for short) or $6CaO \cdot Al_2O_3 \cdot Fe_2O_3$ ($C_6AF$ for short), calcium ferrite such as $2CaO \cdot Fe_2O_3$ ($C_2F$ for short), etc., which should preferably be used alone or in combinations of two or more.

There is no specific limitation on the form of calcium carbonate contained in the expanding material used herein.

The CaO raw material includes limestone and hydrated or slaked lime; the $Al_2O_3$ raw material includes bauxite and aluminum residual ash; the $Fe_2O_3$ raw material includes copper slag and commercially available iron oxide; the $SiO_2$ raw material includes silica stone or the like; and the $CaSO_4$ raw material includes calcium sulfate dihydrate, calcium hemihydrite and calcium anhydride.

These raw materials often contain impurities, but it would not matter if they are contained in the range that is not detriment to the advantages of the invention. The impurities, for instance, include $MgO$, $TiO_2$, $ZrO_2$, $MnO$, $P_2O_5$, $Na_2O$, $K_2O$, $Li_2O$, sulfur, fluorine, and chlorine.

There is no particular limitation on a thermal treatment method for preparing the expanding material used herein; however, it is preferable to carry out firing at temperatures of 1,100 to 1,600° C., and especially 1,200 to 1,500° C. using an electric furnace, a kiln or the like.

The proportion of each mineral contained in the expanding material used herein should preferably be in the following range.

The content of free lime should be preferably 10 to 70 parts, and more preferably 18 to 60 parts in 100 parts of the expanding material; the content of the hydraulic compound should be preferably 10 to 50 parts, and more preferably 20 to 40 parts in 100 parts of the expanding material; and the content of calcium sulfate anhydrite should be preferably 1 to 55 parts, and more preferably 20 to 50 parts in 100 parts of the expanding material.

When the expanding material is treated with carbon dioxide gas to form calcium carbonate, the proportion calcium carbonate should be preferably 0.1 to 10 parts, and more preferably 1 to 5 parts in 100 parts of the expanding material. Any departure from those ranges would likely result in an insufficient enhancement effect on the initial strength, and poor storability.

The content of each mineral may be determined by general analytical methods so far known in the art. For instance, pulverized samples may be placed on a powder X-ray diffractometer to determine the resultant minerals, and the data may be analyzed by the Rietveld method to quantify the minerals. Alternatively, on the basis of chemical components and the results of identification of powder X-ray diffractometry, the quantities of the minerals may be figured out by calculation. The content of calcium carbonate may be quantified from weight changes in association with decarboxylation of calcium carbonate by means of a differential thermobalance (TG-DTA), differential calorimetry (DSC) or the like.

Whether or not calcium carbonate is formed by treatment with carbon dioxide gas may be determined by an electron microscope or the like. More specifically, the expanding material is included and embedded in a resin, and surface treated with argon ion beams to observe particle tissues in section, and elementary analysis is carried out to determine whether calcium carbonate coexists with other minerals in the same particle.

The treatment with carbon dioxide gas of the expanding material used herein should preferably be carried out under the following conditions.

The flow rate of carbon dioxide gas to a carbonation vessel should preferably be 0.01 to 0.1 L/min. per 1 L of the volume of the carbonation vessel. Any smaller amount would often take much time for carbonation, and any larger amount is uneconomical because further increases in the carbonation rate could hardly be expected. Note here that the instant conditions apply to when a crucible used as the carbonation vessel remains stationary in an electric furnace and carbon dioxide gas flows through it for reactions, but they do not hold true for the reaction of clinker with carbon dioxide gas in other manners.

The temperature of the carbonation vessel should preferably be 200 to 800° C. Any lower temperature would often retard the carbonation reaction of the expanding material, and any higher temperature would often be incapable of forming calcium carbonate because even once the expanding material has changed into calcium carbonate, decarboxylation reactions take place again.

It is here to be noted that for the carbonation of the expanding material, the expanding material clinker may be carbonated in an unpulverized state, or pulverized before carbonation.

There is no particular limitation on the carbonation vessel used herein; only the requirement for it is that the expanding material is capable of contacting and reacting with carbon dioxide gas, meaning that use may be made of an electric furnace, a fluidized-bed type heating furnace, or a mill for pulverization of the expanding material clinker.

By surface treatment with the shrinkage reducer of the expanding material used herein, it is possible to obtain the effect on reductions of hexavalent chromium over an extended period of time.

Although there is no limitation on the type of shrinkage reducers, preference is given to shrinkage reducers based on low-molecular-weight alkylene oxide copolymers, glycol ether.aminoalcohol derivatives, and alkylene oxide adducts of lower alcohols. For instance, there is a commercially available product "SK-Guard" made by Denki Kagaku Kogyo Kabushiki Kaisha.

Although there is no particular limitation on the amount of the shrinkage reducer blended, it should preferably be used for surface treatment in an amount of 0.5 to 15 parts per 100 parts of the expanding material.

The fineness of the expanding material used herein should be preferably 1,500 to 9,000 cm$^2$/g, and more preferably 2,000 to 7,000 cm$^2$/g in terms of the Blaine's specific surface area (hereinafter called the Blaine's value).

Although there is no particular limitation on the amount of the expanding material blended with the cement admixture, it is usually preferable that the expanding material accounts for 90 to 99.7 parts in 100 parts of the cement admixture comprising the expanding material and the tin sulfate-containing substance. Any departure from this range would often cause the effect on reductions of hexavalent chromium to become tenuous and the ability of concrete to bring about strength to go worse.

There is no particular limitation on the tin sulfate-containing substance used herein; any substance may be used provided that it contains tin sulfates. For the material capable of reducing hexavalent chromium, not only tin sulfates but also iron sulfate-base materials are generally known in the art; in the invention, however, it is preferable to use tin sulfates because the effect on reductions of hexavalent chromium grows higher.

The content of tin sulfates in the tin sulfate-containing substance should be preferably at least 30%, and more preferably at least 50%. Smaller amounts are not preferable because of an increase in the amount of that substance used for the purpose of achieving given performance.

Although there is no particular limitation on the amount of the tin sulfate-containing substance blended with the cement admixture, it is preferable that the tin sulfate-containing substance usually accounts for 0.2 to 8 parts—as calculated on a tin sulfate basis—in 100 parts of the cement admixture comprising the expanding material and the tin sulfate-containing substance. Any departure from the aforesaid range would often cause the effect on reductions of hexavalent chromium to become insufficient, and the enhancement effect on initial strength to become tenuous.

Although there is no particular limitation on the amount of the inventive cement admixture used because of changing on concrete blending, it is usually preferable that the cement admixture accounts for 3 to 15 parts, and especially 5 to 12 parts in 100 parts of the cement composition comprising cement and the cement admixture. Any departure from the aforesaid range would often cause the effect on reductions of hexavalent chromium to become insufficient and the enhancement effect on initial strength to become tenuous.

The cement used in the inventive cement composition includes a variety of Portland cements such as normal Portland cement, high-early strength Portland cement, super-early strength Portland cement, low-heat Portland cement and moderate-heat Portland cement, a variety of mixed cements of those Portland cements with blast-furnace slag, fly ash or silica, filler cements mixed with limestone powders, and so on.

The inventive cement admixture and composition may be used in combination with not only sand and gravel but also water-reducing agents, AE water-reducing agents, high-performance water-reducing agents, AE water-reducing agents, high-performance AE water-reducing agent, fluidization agents, defoamers, thickeners, rustproofing agents, antifreezers, shrinkage reducers, high-molecular emulsions and setting modifiers as well as cement hardening accelerators, clay minerals such as bentonite, ion exchangers such as zeolite, silica fine powders, calcium carbonate, calcium hydroxide, calcium sulfates, calcium silicate, and so on. Organic materials may be used too, inclusive of fibrous materials such as vinylon fibers, acryl fibers and carbon fibers.

EXAMPLES

The present invention will now be explained in further details with reference to examples.

Experimental Example 1

Cement admixtures were prepared while varying the proportions of the expanding material and stannous sulfate contained in 100 parts of the cement admixture comprising the expanding material and the stannous sulfate-containing substance as shown in Table 1.

Then, there was a reference mortar prepared comprising 405 grams of cement, 45 grams of incinerated sewage sludge ash, 225 grams of water and 1,350 grams of sand.

Further, mortars with the cement admixture blended in the amounts set out in Table 1 in cement were formulated in a 20° C. atmosphere. Each mortar was deformed at a material age of 1 day, and aged in 20° C. water for 6 days, after which its compressive strength and the amount of dissolution of hexavalent chromium out from the set mortar were estimated.

A comparative experiment run was also carried out using ferrous sulfate instead of stannous sulfate. The results are tabulated in Table 1.

Materials Used
Cement: Normal Portland cement of 3.16 g/cm$^3$ in density
Incinerated Sewage Sludge Ash:
"Super Ash" discharged out from Tokyo Metropolis with a density of 2.60 g/cm$^3$ and an average particle diameter of 30 μm
Expanding Material A:
Commercial product composed of 21 parts of free lime, 32 parts of hauyne and 47 parts of calcium sulfate anhydrite and having a density of 2.90 g/cm$^3$ and a Blaine's value of 6,000 cm$^2$/g
Stannous Sulfate-Containing Substance:
Available from Grace Chemicals Co., Ltd. in the trade name of "SYNCRO" with a stannous sulfate content of 75%
Ferrous sulfate: Reagent
Sand: JIS standard sand
Water: Tap water
Testing Methods
Compressive Strength:
A 4×4×16 cm testing sample was prepared according to JIS R 5201, and measured for its compressive strength at a material age of 7 days.
Amount of Dissolution of Hexavalent Chromium:
For hexavalent chromium, dissolution testing and quantification were carried out pursuant to Notification No. 46 of the Environment Agency.

TABLE 1

| Ex. No. | Cement Admixture (parts) | | Amount of the Cement Admixture Blended (grams) |
|---|---|---|---|
| | (E) | (S) | |
| 1-1 | A 100 | 0.0 | 45 |
| 1-2 | A 99.9 | 0.1 | 45 |
| 1-3 | A 99.7 | 0.3 | 45 |
| 1-4 | A 99.5 | 0.5 | 45 |
| 1-5 | A 99.0 | 1.0 | 45 |
| 1-6 | A 97.0 | 3.0 | 45 |
| 1-7 | A 95.0 | 5.0 | 45 |
| 1-8 | A 90.0 | 10.0 | 45 |
| 1-9 | Only stannous sulfate added | | 0.45 |
| 1-10 | A 99.0 Ferrous Sulfate 1.0 | | 45 |
| 1-11 | Only ferrous sulfate added | | 0.45 |
| 1-12 | No Cement Admixture | | 0 |

| Ex. No. | Compressive Strength (N/mm$^2$), 7 Days | Amount of Dissolution of Hexavalent Chromium (ppb) | Remarks |
|---|---|---|---|
| 1-1 | 39.3 | 18.8 | Comparative |
| 1-2 | 39.2 | 15.0 | Inventive |
| 1-3 | 39.3 | 12.3 | Inventive |
| 1-4 | 39.0 | 8.3 | Inventive |
| 1-5 | 38.9 | 6.1 | Inventive |
| 1-6 | 38.2 | 5.8 | Inventive |
| 1-7 | 36.3 | 5.5 | Inventive |
| 1-8 | 33.2 | 3.3 | Inventive |
| 1-9 | 32.8 | 13.5 | Comparative |
| 1-10 | 38.0 | 15.2 | Comparative |
| 1-11 | 32.5 | 18.3 | Comparative |
| 1-12 | 32.0 | 21.0 | Comparative |

(E): Expanding Material
(S): Stannous Sulfate-Containing Substance
The amount of the cement admixture is the one contained in cement.

From Table 1, it is found that in Experiment No. 1-12 where no cement admixture is used, the amount of dissolution of hexavalent chromium is 21.0 ppb; in Experiment No. 1-1 where only the expanding material is used, the amount of dissolution of hexavalent chromium is down to 18.8 pbm at most; and in Experiment No. 1-9 where only stannous sulfate is used, the amount of dissolution of hexavalent chromium is down to 13.5 ppb at most; but in Experiment No. 1-4 where the expanding material is used in combination with stannous sulfate, the amount of dissolution of hexavalent chromium is down to as low as 8.3 ppb, indicating that the combined use of the expanding agent with stannous sulfate has some noticeable synergistic effect.

Experimental Example 2

Experimental Example 1 was repeated with the exception that in 100 parts of the cement admixture comprising the expanding material and the stannous sulfate-containing substance, the amount of the stannous sulfate-containing substance was fixed at 1.0 part and different expanding materials were used for estimation of the cement admixture before and after storage. Note here that for comparison purposes, the sole use of the expanding materials with no addition of the stannous sulfate-containing substance was also estimated. The results are tabulated in Table 1.

Materials Used

Expanding Material B:

A crucible having Expanding Material A placed in it was set in an electric furnace in which it was fired for 30-minute reactions at a firing temperature of 600° C. while there was a flow of carbon dioxide gas in a rate of 0.05 L/min. per 1 L of the internal volume of the electric furnace to synthesize Expanding Material B that comprised 19 parts of free lime, 30 parts of hauyne, 45 parts of calcium sulfate anhydrite and 1 part of calcium carbonate and had a density of 2.90 g/cm$^3$ and a Blaine's value of 6,000 cm$^2$/g.

Expanding Material C:

Two parts of the shrinkage reducer were added to 100 parts of Expanding Material A for surface treatment to obtain Expanding Material C that had a density of 2.90 g/cm$^3$ and a Blaine's value of 6,000 cm$^2$/g.

Expanding Material D:

Consisting of 21 parts of free lime, 32 parts of hauyne and 47 parts of calcium sulfate anhydrite and having a density of 2.90 g/cm$^3$ and a Blaine's value of 3,000 cm$^2$/g Expanding Material E:

A commercial product consisting of 50 parts of free lime, 10 parts of hauyne, 5 parts of $C_4AF$, 5 parts of $C_2S$ and 30 parts of calcium sulfate anhydrite and having a density of 3.05 g/cm$^3$ and a Blaine's value of 3,000 cm$^2$/g Expanding Material F:

A crucible having Expanding Material C placed in it was set in an electric furnace in which it was fired for 30-minute reactions at a firing temperature of 600° C. while there was a flow of carbon dioxide gas in a rate of 0.05 L/min. per 1 L of the internal volume of the electric furnace to synthesize Expanding Material F that consisted of 49 parts of free lime, 10 parts of hauyne, 5 parts of $C_4AF$, 5 parts of $C_2S$, 30 parts of calcium sulfate anhydrite and 1 part of calcium carbonate and had a density of 3.05 g/cm$^3$ and a Blaine's value of 3,000 cm$^2$/g.

Expanding Material G:

Consisting of 20 parts of free lime, 5 parts of $C_4AF$, 30 parts of $C_2S$ and 45 parts of calcium sulfate anhydrite and having a density of 2.93 g/cm$^3$ and a Blaine's value of 6,000 cm$^2$/g Expanding Material H:

Consisting of 50 parts of free lime, 15 parts of $C_4AF$, 5 parts of $C_2S$ and 30 parts of calcium sulfate anhydrite and having a density of 3.05 g/cm$^3$ and a Blaine's value of 3,000 cm$^2$/g Carbon Dioxide Gas: Commercial product Shrinkage Reducer:

A shrinkage reducer based on low-molecular-weight alkylene oxide copolymers, "SK Guard" made by Denki Kagaku Kogyo Kabushiki Kaisha Testing Method Accelerated Storage Testing:

One hundred (100) grams of the cement admixture were spread out and placed on a 20×20 cm square tray, and let stand alone in a room of 20° C. and 60% RH for three days with the upper surface remaining open. After the elapse of three days, the recovered samples were used to prepare mortar samples for estimation of their physical properties.

TABLE 2

| Ex. No. | Cement Admixture (parts) (E) | (S) | Amount of the Cement Admixture Blended (grams) |
|---|---|---|---|
| 1-5 | A 99.0 | 1.0 | 45 |
| 2-1 | B 99.0 | 1.0 | 45 |
| 2-2 | C 99.0 | 1.0 | 45 |
| 2-3 | D 99.0 | 1.0 | 45 |
| 2-4 | E 99.0 | 1.0 | 31.5 |
| 2-5 | F 99.0 | 1.0 | 31.5 |
| 2-6 | G 99.0 | 1.0 | 45 |
| 2-7 | H 90.0 | 1.0 | 31.5 |
| 1-1 | A 100 | 0 | 45 |
| 2-8 | B 100 | 0 | 45 |
| 2-9 | C 100 | 0 | 45 |
| 2-10 | D 100 | 0 | 45 |
| 2-11 | E 100 | 0 | 31.5 |
| 2-12 | F 100 | 0 | 31.5 |
| 1-9 | Only stannous sulfate added | | 0.45 |
| 2-13 | Only stannous sulfate Added | | 0.315 |
| 1-12 | No Cement Admixture | | 0 |

| Ex. No. | Compressive Strength (N/mm$^2$), 7 Days Before/After Storage | Amount of Dissolution of Hexavalent Chromium (ppb) Before/After Storage | Remarks |
|---|---|---|---|
| 1-5 | 38.9/34.5 | 6.1/9.8 | Inventive |
| 2-1 | 39.0/38.8 | 6.1/6.3 | Inventive |
| 2-2 | 38.6/36.6 | 6.1/6.8 | Inventive |
| 2-3 | 38.0/37.0 | 6.2/7.0 | Inventive |
| 2-4 | 36.5/33.0 | 9.0/14.4 | Inventive |
| 2-5 | 36.0/35.9 | 8.9/9.2 | Inventive |
| 2-6 | 35.6/35.5 | 11.6/13.3 | Inventive |
| 2-7 | 32.6/33.0 | 10.3/15.8 | Inventive |
| 1-1 | 39.3/34.6 | 18.8/18.9 | Comparative |
| 2-8 | 39.0/38.5 | 17.5/17.5 | Comparative |
| 2-9 | 38.9/36.8 | 17.7/17.9 | Comparative |
| 2-10 | 38.1/37.6 | 19.0/19.2 | Comparative |
| 2-11 | 36.3/33.5 | 19.3/20.2 | Comparative |
| 2-12 | 38.0/35.8 | 19.2/19.3 | Comparative |
| 1-9 | 32.8/32.8 | 13.5/14.5 | Comparative |
| 2-13 | 32.0/32.3 | 15.7/16.2 | Comparative |
| 1-12 | 32.0/32.0 | 21.0/21.0 | Comparative |

(E): Expanding Material
(S): Stannous Sulfate-Containing Substance
The amount of the cement admixture is the one contained in cement.

From Table 2, it is found that in Experiment No. 1-12 where no cement admixture is used, the amount of dissolution of hexavalent chromium is 21.0 ppb; in Experiment Nos. 1-1, 2-8 to 2-12 where only the expanding materials are used, the amount of dissolution of hexa-valent chromium is down to 17.5 to 19.3 ppb at most; and in Experiment Nos. 1-9 and 2-13 where only the stannous sulfate is used, the amount of dissolution is down to 13.5 ppb and 15.7 ppb at most, but in Experiment Nos. 2-1 to 2-7 where the expanding materials and stannous sulfate are used in combination according to the invention, the amount of dissolution of hexavalent chromium is down to as low as 6.1 to 11.6 ppb, indicating some noticeable synergistic effects.

Experimental Example 3

Concrete samples were estimated for performance while the amount of stannous sulfate blended was fixed at 1.0 part in 100 parts of the cement admixture comprising Expanding Material A and the stannous sulfate-containing substance.

The concrete blend was made up of cement in a unit amount of 460 kg, incinerated sewage sludge ash in an unit amount of 48 kg, water in a unit amount of 198 kg and a water-reducing agent in a unit amount of 5.3 kg with S/a=55% and the cement admixture blended in an amount of 20 kg in cement. Concrete was placed at 20° C., and pre-aged for 2 hours at 20° C., after which it was held for 4 hours at a maximum temperature of 60° C. in a heating rate of 20° C./hour, followed by natural cooling. At a material age of one day, the concrete was deformed and aged for 6 days in water at 20° C., after which compressive strength testing and hexavalent chromium dissolution testing were carried out. The results are tabulated in Table 3.

It is here to be noted that for comparison purposes, similar tests were carried out with the addition of only the expanding material, the addition of only stannous sulfate, and no addition of the cement admixture.

Materials Used

Fine Aggregate: Occurring in Himekawa with <5 mm and a density of 2.60 g/cm$^3$

Coarse Aggregate: Occurring in Himekawa with <25 mm and a density of 2.67 g/cm$^3$ Water-Reducing Agent: Naphthalene sulfonate, "Mighty 150" made by Kao Corporation

TABLE 3

| Ex. No. | Cement Admixture | Amount of the Cement Admixture Blended (kg) |
|---|---|---|
| 3-1 | Combined use of the expanding material and stannous sulfate | 20 |
| 3-2 | Addition of the expanding material alone | 20 |
| 3-3 | Addition of stannous sulfate alone | 0.2 |
| 4-4 | None | 0 |

| Ex. No. | Compressive Strength (N/mm$^2$), 7 days | Amount of Dissolution of Hexavalent Chromium (ppb) | Remarks |
|---|---|---|---|
| 3-1 | 44.5 | 6.3 | Inventive |
| 3-2 | 44.0 | 17.9 | Comparative |
| 3-3 | 39.1 | 14.5 | Comparative |
| 3-4 | 39.3 | 21.1 | Comparative |

The amount of the cement admixture is the one contained in cement.

APPLICABILITY TO THE INDUSTRY

The cement admixture of the invention improves the ability of concrete to bring about high initial strength, works in favor of enhancing the effect on hexavalent chromium reductions, and is less likely to decrease in the effect on hexavalent chromium reductions even upon storage. The cement admixture of the invention, therefore, may be useful for the production of concrete products using cement containing a lot more hexavalent chromium, and incinerated sewage sludge ashes.

What is claimed is:

1. A cement admixture, comprising:
    an expanding material containing free lime, a hydraulic compound and calcium sulfate anhydrite, and
    a tin sulfate-containing substance.

2. The cement admixture according to claim 1, wherein said tin sulfate-containing substance is contained in an amount of 0.2 to 8 parts by mass—as calculated on a tin sulfate basis—in a total of 100 parts by mass of said expanding material and said tin sulfate-containing substance.

3. The cement admixture according to claim 1, wherein said expanding material has been treated with carbon dioxide gas to form calcium carbonate therein.

4. The cement admixture according to claim 1, wherein said expanding material has been surface treated with a shrinkage reducer.

5. A cement composition, comprising:
    cement, and
    the cement admixture according to claim 1.

* * * * *